(12) United States Patent
Shimatani (10) Patent No.: US 9,706,073 B2
(45) Date of Patent: Jul. 11, 2017

(54) IMAGE READING DEVICE AND IMAGE FORMING APPARATUS

(71) Applicant: KYOCERA Document Solutions Inc., Osaka-shi, Osaka (JP)

(72) Inventor: Akira Shimatani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/077,786

(22) Filed: Mar. 22, 2016

(65) Prior Publication Data
US 2016/0286070 A1 Sep. 29, 2016

(30) Foreign Application Priority Data
Mar. 25, 2015 (JP) ................. 2015-061900

(51) Int. Cl.
| H04N 1/46 | (2006.01) |
| H04N 1/04 | (2006.01) |
| H04N 1/192 | (2006.01) |
| H04N 1/024 | (2006.01) |

(52) U.S. Cl.
CPC ............. *H04N 1/192* (2013.01); *H04N 1/024* (2013.01); *H04N 2201/0094* (2013.01)

(58) Field of Classification Search
CPC . H04N 1/192; H04N 1/024; H04N 2201/0094
See application file for complete search history.

(56) References Cited

U.S. PATENT DOCUMENTS

| 6,958,835 | B2* | 10/2005 | Sakakibara | ............ | H04N 1/486 |
| | | | | | 358/446 |
| 7,236,265 | B2* | 6/2007 | Hiromatsu | ........... | H04N 1/4076 |
| | | | | | 358/1.9 |
| 8,541,730 | B2* | 9/2013 | Inuiya | ............... | H01L 27/14634 |
| | | | | | 250/208.1 |
| 2003/0072497 | A1* | 4/2003 | Hiromatsu | ............. | H04N 1/401 |
| | | | | | 382/274 |
| 2005/0174610 | A1* | 8/2005 | Fukawa | ................. | H04N 9/045 |
| | | | | | 358/461 |
| 2010/0142009 | A1* | 6/2010 | Tsukahara | ............ | H04N 1/4072 |
| | | | | | 358/475 |

(Continued)

FOREIGN PATENT DOCUMENTS

JP 2012010320 A 1/2012

*Primary Examiner* — Cheukfan Lee
(74) *Attorney, Agent, or Firm* — Alleman Hall Creasman & Tuttle LLP (57) ABSTRACT

This image reading device includes an image sensor module, an environment maintaining portion, and a level correction portion. The image sensor module includes a light emitting portion and a plurality of single-channel light amount sensors. The environment maintaining portion maintains, at a constant state, a light receiving environment for a reference portion forming an end portion, of a single-channel light amount sensor, which corresponds to an end portion of the main scanning region. The level correction portion corrects, each time the image sensor module outputs detection data that corresponds to the main scanning region, a level of the detection data from each of all the single-channel light amount sensors in accordance with a deviation between a level of the detection data regarding the reference portion and a reference level set in advance.

4 Claims, 5 Drawing Sheets

(56) References Cited

U.S. PATENT DOCUMENTS

2011/0007369 A1\* 1/2011 Shiraishi .............. H04N 1/1903
 358/483
2011/0026085 A1\* 2/2011 Tsukahara ............ H04N 1/1903
 358/482
2013/0170000 A1\* 7/2013 Kurakata ................ H04N 1/04
 358/461

\* cited by examiner

IMAGE READING DEVICE AND IMAGE FORMING APPARATUS

INCORPORATION BY REFERENCE

This application is based upon and claims the benefit of priority from the corresponding Japanese Patent Application No. 2015-061900 filed on Mar. 25, 2015, the entire contents of which are incorporated herein by reference.

BACKGROUND

The present disclosure relates to an image reading device and an image forming apparatus equipped with the image reading device.

In general, it is known that, in an image reading device, a CIS (contact image sensor) is employed as an image sensor for reading an image of a document sheet. In order to improve the speed of reading an image, a CIS module having a plurality of channels is employed in some cases.

The CIS module having a plurality of channels includes a light emitting portion and a plurality of single-channel light amount sensors. The light emitting portion emits light to a main scanning region extending along one straight line. The plurality of single-channel light amount sensors are disposed in series along the main scanning region. Each of the single-channel light amount sensors receives light from its corresponding one of partial scanning regions which are each a part of the main scanning region, and outputs detection data of the amount of the received light. The respective single-channel light amount sensors perform the receiving of the light and the outputting of the detection data in parallel.

It is also known that: the plurality of CISs are disposed along the main scanning direction with their respective end portions overlapping each other, and image data outputted by each CIS is corrected on the basis of a detection result of variation of the amount of light from the light emitting portion in the CIS. In this case, on the basis of data read from a white reference plate opposed to an end portion of each CIS, variation of the amount of light from the light emitting portion is detected.

SUMMARY

An image reading device according to one aspect of the present disclosure includes: an image sensor module, an environment maintaining portion, and a level correction portion. The image sensor module includes a light emitting portion and a plurality of single-channel light amount sensors. The light emitting portion emits light to a main scanning region extending along one straight line. The single-channel light amount sensors perform in parallel receiving light from corresponding partial scanning regions which are each a part of the main scanning region, and outputting detection data of an amount of the received light. The environment maintaining portion maintains, at a constant state, a light receiving environment for a reference portion forming an end portion of a single-channel light amount sensor which corresponds to an end portion of the main scanning region. The level correction portion corrects a level of the detection data from each of all the single-channel light amount sensors in accordance with a deviation between a level of the detection data regarding the reference portion and a reference level set in advance. The level correction portion corrects the level of the detection data each time the image sensor module outputs the detection data that corresponds to the main scanning region.

An image forming apparatus according to another aspect of the present disclosure includes the image reading device according to the one aspect of the present disclosure and an image forming portion. The image forming portion forms, on a recording medium, an image that corresponds to the detection data having been corrected, the detection data being obtained by the image reading device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It should be noted that the following embodiment is one example embodying the present disclosure, and, by nature, does not limit the technical scope of the present disclosure.

[Configuration of Apparatus]

First, an image reading device 1 and an image forming apparatus 10 including the image reading device 1 according to the present embodiment will be described with reference to FIGS. 1 to 4. The image forming apparatus 10 includes a body portion 2 and the image reading device 1. The image forming apparatus 10 also includes: an operation display portion 80; and a control portion 8 which controls devices of the body portion 2 and the image reading device 1.

For example, the image forming apparatus 10 is a copier, a printer or a facsimile having the function of a copier, a multifunction peripheral having a plurality of image processing functions including an image reading function, or the like.

<Image Reading Device 1>

Figure 1:
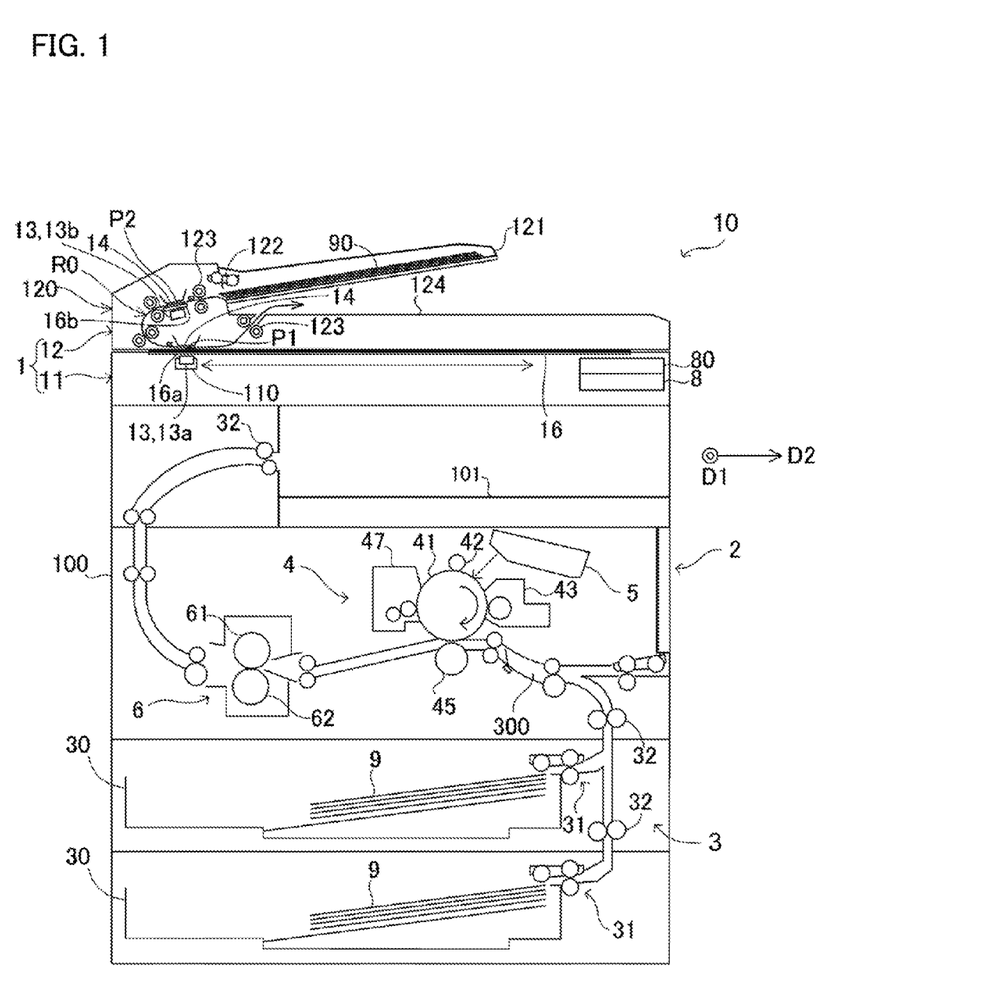
FIG. 1 is a configuration diagram of an image forming apparatus that includes an image reading device according to an embodiment of the present disclosure.

As shown in FIG. 1, the image reading device 1 includes a document sheet scanning unit 11 and a document sheet table cover 12. The document sheet table cover 12 is supported so as to be rotatable relative to the document sheet scanning unit 11. The document sheet scanning unit 11 includes a transparent document sheet table 16, and the document sheet table cover 12 is rotatable between a closed position at which the document sheet table cover 12 covers the document sheet table 16 and an open position at which the document sheet table 16 is exposed.

The document sheet table 16 is a portion where a document sheet 90 from which an image is to be read is placed. In general, the document sheet table 16 is referred to as a platen glass.

The document sheet scanning unit 11 further includes a first image sensor 13*a*, a scanning mechanism 110, and the like. In the description below, one horizontal direction and its corresponding horizontal direction orthogonal thereto will be referred to as a main scanning direction D1 and a sub scanning direction D2, respectively.

The first image sensor 13*a* reads an image that corresponds to one line along the main scanning direction D1 in the document sheet 90, and outputs image data that corresponds to the read image. The scanning mechanism 110 causes the first image sensor 13*a* to shuttle along the sub scanning direction D2 at a position close to the document sheet table 16.

By moving along the sub scanning direction D2, the first image sensor 13*a* reads an image of the lower surface of the document sheet 90 placed on the document sheet table 16, and outputs image data that corresponds to the read image.

The document sheet table cover 12 has an ADF 120 incorporated therein. The ADF 120 includes a document sheet supply tray 121, a document sheet sending-out mechanism 122, a document sheet conveying mechanism 123, and a document sheet discharge tray 124. The document sheet sending-out mechanism 122 sends out one by one, to a document sheet conveying path R0, document sheets 90 set on the document sheet supply tray 121.

The document sheet conveying path R0 is formed along a predetermined route which passes a first position P1 extending along a first contact portion 16*a* being a part of the document sheet table 16, and a second position P2 in the document sheet table cover 12.

A transparent second contact portion 16*b* is fixed so as to extend along the second position P2. The scanning mechanism 110 can hold the first image sensor 13*a* at a position opposed to the first position P1. The first image sensor 13*a* is held in a state of being opposed to the first position P1 via the transparent first contact portion 16*a*.

The document sheet conveying mechanism 123 conveys the document sheet 90 sent out from the document sheet sending-out mechanism 122, along the document sheet conveying path R0, and discharges the document onto the document sheet discharge tray 124. The document sheet conveying mechanism 123 includes: a roller pair which rotates while nipping the document sheet 90 therebetween; a motor which drives one roller of the roller pair to rotate; and the like. The document sheet conveying mechanism 123 is one example of a document sheet conveying portion.

The main scanning direction D1 is a direction orthogonal to the conveyance direction of the document sheet 90 in the document sheet conveying path R0. In the description below, the upstream side and the downstream side in the conveyance direction of the document sheet 90 in the document sheet conveying path R0 will be simply referred to as the conveyance upstream side and the conveyance downstream side, respectively.

Figure 2:
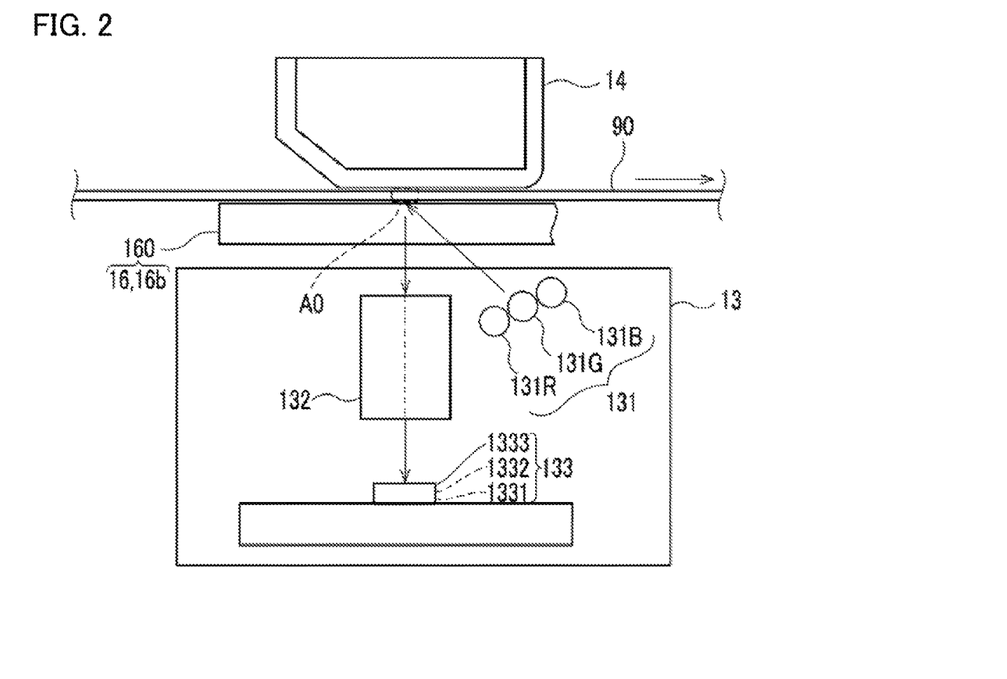
FIG. 2 is a configuration diagram of an image sensor and a periphery thereof in the image reading device according to the embodiment of the present disclosure.

In the example shown in FIGS. 1 and 2, the first position P1 is on the conveyance downstream side relative to the second position P2 in the document sheet conveying path R0. In other words, the second position P2 is on the conveyance upstream side relative to the first position P1. However, it is also conceivable that the second position P2 is on the downstream side of the document sheet relative to the first position P1.

The ADF 120 operates in a state where the document sheet table cover 12 is present at the closed position and the first image sensor 13*a* is opposed to the first position P1.

In addition, a second image sensor 13*b* is provided in the document sheet table cover 12. The second image sensor 13*b* is fixed at a position opposed to the second position P2 in the document sheet conveying path R0. The second image sensor 13*b* is fixed in a state of being opposed to the second position P2 via the transparent second contact portion 16*b*.

The first image sensor 13*a* reads an image on a first surface of the document sheet 90 being moved at the first position P1, and outputs image data that corresponds to the read image. On the other hand, the second image sensor 13*b* reads an image on a second surface of the document sheet 90 being moved at the second position P2, and outputs image data that corresponds to the read image. The second surface is the surface on the opposite side of the first surface.

In the present embodiment, each of the first image sensor 13*a* and the second image sensor 13*b* is a CIS module having a plurality of channels. In the description below, the first image sensor 13*a* and the second image sensor 13*b* are collectively referred to as an image sensor 13. The image sensor 13 is one example of an image sensor module having a plurality of channels. It is conceivable that the image sensor 13 is formed by one image sensor module having a length of the entire image reading range in the main scanning direction D1. It is also conceivable that the image sensor 13 is formed by a plurality of image sensor modules which are each shorter than the length of the entire image reading range and which are disposed along the main scanning direction D1.

Figure 3:
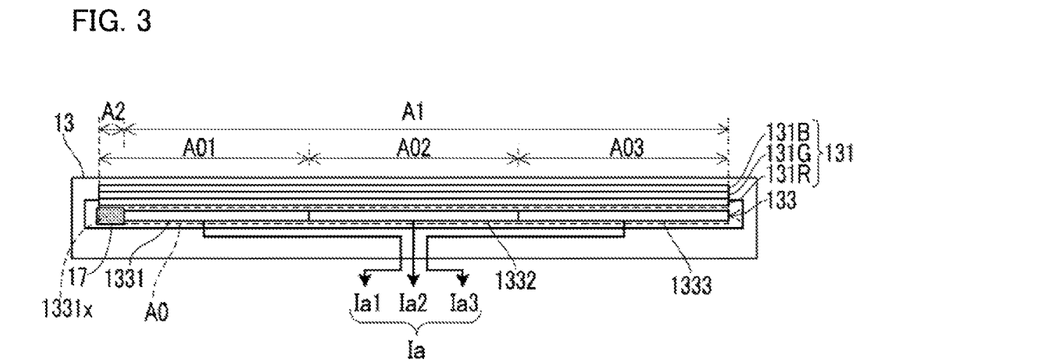
FIG. 3 is a schematic plan view showing the inside of the image sensor in the image reading device according to the embodiment of the present disclosure.

As shown in FIGS. 2 and 3, the image sensor 13 includes a plurality of light emitting portions 131, a lens 132 and a light amount sensor 133. The plurality of light emitting portions 131, the lens 132, and the light amount sensor 133 are each formed so as to extend along the main scanning direction D1.

The light emitting portions 131 include a red light emitting portion 131R, a green light emitting portion 131G, and a blue light emitting portion 131B. The light emitting portions 131 and the lens 132 are each formed in a bar shape that extends along the main scanning direction D1. The red light emitting portion 131R, the green light emitting portion 131G, and the blue light emitting portion 131B have different emitted light colors, respectively, and can emit light individually.

Each light emitting portion 131 emits light to a main scanning region A0 extending along one straight line. The main scanning region A0 is a region that extends along the main scanning direction D1.

The light amount sensor 133 receives light from the main scanning region A0 and outputs detection data of the amount of the received light. The detection data is data representing the amount of the received light, and also is data representing the density of the image in the main scanning region A0.

That is, in the case where the detection data is data that has a greater value in accordance with increase in the amount of the received light, the detection data indicates that the smaller the value is, the higher the density of the image in the main scanning region A0 is. Hereinafter, the detection data directly outputted from the light amount sensor 133 will be referred to as primary image data Ia. The primary image data Ia is analog data.

For the first image sensor 13a located at the first position P1, the main scanning region A0 is a region on the first surface of the document sheet 90 being moved along the document sheet conveying path R0. For the second image sensor 13b, the main scanning region A0 is a region on the second surface of the document sheet 90 being moved along the document sheet conveying path R0. For the first image sensor 13a being moved by the scanning mechanism 110, the main scanning region A0 is a region on the lower surface of the document sheet 90 placed on the document sheet table 16.

For example, it is conceivable that each light emitting portion 131 is an LED array that includes a plurality of light emitting diodes disposed along the main scanning direction D1. It is also conceivable that each light emitting portion 131 includes: one or a plurality of light sources; and an optical system such as a light guide body and a cylindrical lens which converts light emitted from the light source into sheet-like light.

The light amount sensor 133 includes a plurality of single-channel light amount sensors 1331, 1332, and 1333 disposed in series along the main scanning direction D1. Each of the single-channel light amount sensors 1331, 1332, and 1333 receives light from its corresponding one of partial scanning regions A01, A02, and A03 each being a part of the main scanning region A0, and outputs detection data of the amount of the received light. The plurality of single-channel light amount sensors 1331, 1332, and 1333 perform the process from the receiving of the light to the outputting of the detection data in parallel.

The partial scanning regions A01, A02, and A03 are regions obtained by dividing the main scanning region A0 into a plurality of sections. In the example shown in FIG. 3, the light amount sensor 133 includes three single-channel light amount sensors 1331, 1332, and 1333. Each of the single-channel light amount sensors 1331, 1332, and 1333 receives light from its corresponding one of the three partial scanning regions A01, A02, and A03 in the main scanning region A0, and outputs detection data of the amount of the received light. It is also conceivable that the light amount sensor 133 includes two, four, or more of the single-channel light amount sensors.

Each single-channel light amount sensor 1331, 1332, 1333 outputs corresponding primary image partial data Ia1, Ia2, Ia3 each being a part of the primary image data Ia, as detection data of the amount of the received light. Each primary image partial data Ia1, Ia2, Ia3 is a data row regarding a plurality of pixels in its corresponding partial scanning region A01, A02, A03.

Each single-channel light amount sensor 1331, 1332, 1333 includes a plurality of photoelectric conversion elements disposed along the main scanning direction D1. In general, the photoelectric conversion elements are CMOS image sensors. Each photoelectric conversion element in each single-channel light amount sensor 1331, 1332, 1333 detects the amount of light emitted from its corresponding pixel in the main scanning region A0. That is, the photoelectric conversion elements correspond to the plurality of pixels, respectively. Each single-channel light amount sensor 1331, 1332, 1333 outputs detection data of the light amount of its corresponding pixels, as the primary image partial data Ia1, Ia2, Ia3.

In the description below, the first contact portion 16a opposed to the first image sensor 13a located at the first position P1, the second contact portion 16b opposed to the second image sensor 13b, and a part, of the document sheet table 16, that is opposed to the first image sensor 13a being moved by the scanning mechanism 110 will be collectively referred to as a contact portion 160.

As shown in FIG. 2, the light emitting portion 131 of the image sensor 13 emits light through the contact portion 160 to the main scanning region A0 including a part of the surface of the document sheet 90.

The lens 132 concentrates the light emitted from the main scanning region A0 in the document sheet 90, onto the light-receiving portion of the light amount sensor 133.

The light amount sensor 133 sequentially detects the amount of light emitted from the main scanning region A0 including a part of the surface of the document sheet 90 being relatively moved along the sub scanning direction D2, thereby to read the image of the document sheet 90 sequentially by an amount that corresponds to one line along the main scanning direction D1.

In the step of reading the image of the document sheet 90, the red light emitting portion 131R, the green light emitting portion 131G, the blue light emitting portion 131B are lit in order, and red light, green light, and blue light are emitted in order, to the main scanning region A0. Accordingly, the light amount sensor 133 sequentially outputs three sets of the primary image data Ia respectively representing the densities of a red image, a green image, and a blue image in the main scanning region A0. Accordingly, the image of the document sheet 90 can be read as a color image.

In the case where the image of the document sheet 90 is to be read as a monochrome image, the red light emitting portion 131R, the green light emitting portion 131G, and the blue light emitting portion 131B are lit at the same time, whereby white light is emitted to the main scanning region A0. Accordingly, the light amount sensor 133 sequentially outputs monochrome primary image data Ia representing the density of the image in the main scanning region A0. Accordingly, the image of the document sheet 90 can be read as a monochrome image. It is also conceivable to obtain the monochrome image as a composite image from a three-color image.

The first contact portion 16a and a color reference portion 14 are arranged so as to be opposed to each other, on the opposite sides of the first position P1 in the document sheet conveying path R0. The first image sensor 13a is opposed to the color reference portion 14 via the transparent first contact portion 16a. Similarly, the second contact portion 16b and a color reference portion 14 are arranged so as to be opposed to each other, on the opposite sides of the second position P2 in the document sheet conveying path R0. The second image sensor 13b is opposed to the color reference portion 14 via the transparent second contact portion 16b.

The surface, of each color reference portion 14, that is opposed to its corresponding one of the first image sensor 13a and the second image sensor 13b is a surface having a uniform reference color and having high light reflectance. In general, the reference color is white. It is also conceivable that the reference color is a light yellowish color, or the like.

The image reading device 1 executes an image sensor adjusting step at predetermined timings. In the image sensor adjusting step, the first image sensor 13a operates when the document sheet 90 is not present at the first position P1. Further, through comparison between output data from the first image sensor 13a and brightness reference data set in advance, received-light-amount detection gain of the first image sensor 13a is automatically adjusted.

Similarly, in the image sensor adjusting step, the second image sensor 13b operates when the document sheet 90 is not present at the second position P2. Further, through comparison between output data from the second image sensor 13b and the brightness reference data, received-light-amount detection gain of the second image sensor 13b is automatically adjusted.

Figure 4:
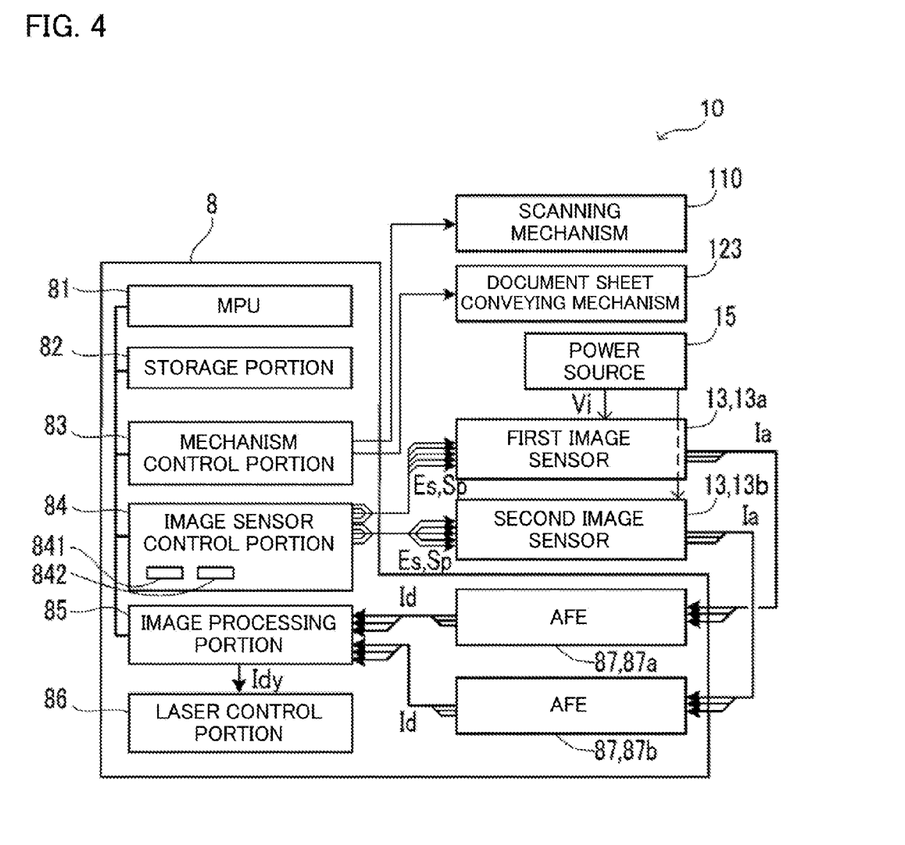
FIG. 4 is a block diagram of control-related devices in the image forming apparatus including the image reading device according to the embodiment of the present disclosure.

To the first image sensor 13a and the second image sensor 13b, a voltage Vi at a predetermined level is applied from a power source 15 (see FIG. 4).

<Body Portion of Image Forming Apparatus 10>

The body portion 2 of the image forming apparatus 10 includes devices which form, on a sheet-like recording medium 9, an image corresponding to the image data outputted from each of the first image sensor 13a and the second image sensor 13b. The recording medium 9 is a sheet-like medium on which an image is to be formed, such as paper, coated paper, a postcard, an envelope, and an OHP sheet, or the like.

The body portion 2 of the image forming apparatus 10 includes a sheet feeding portion 30, a sheet conveying portion 3, an image forming portion 4, a laser scanning portion 5, a fixing portion 6, and the like. The image forming apparatus 10 shown in FIG. 1 is an image forming apparatus of an electrophotography type. It is also conceivable that the image forming apparatus 10 is an image forming apparatus of another type such as an inkjet type.

The sheet feeding portion 30 is configured to allow a plurality of recording media 9 to be placed thereon in a stacked manner. The sheet conveying portion 3 includes a sheet sending-out mechanism 31 and a sheet conveying mechanism 32.

The sheet sending-out mechanism 31 includes rollers which rotate in contact with the recording medium 9, and sends out the recording medium 9 from the sheet feeding portion 30 toward a sheet conveying path 300. The sheet conveying mechanism 32 conveys the recording medium 9 along the sheet conveying path 300. Accordingly, the recording medium 9 passes though the image forming portion 4 and the fixing portion 6, and then, is discharged through the discharge port of the sheet conveying path 300, onto a sheet discharge tray 101.

The image forming portion 4 includes a drum-like photosensitive member 41, a charging device 42, a developing device 43, a transfer device 45, a cleaning device 47, and the like. The photosensitive member 41 is one example of an image carrier which carries an image of a developer.

The photosensitive member 41 rotates and the charging device 42 uniformly charges the surface of the photosensitive member 41. Further, the laser scanning potion 5 performs scanning with laser light, to write an electrostatic latent image on the charged surface of the photosensitive member 41. Further, the developing device 43 supplies the developer to the photosensitive member 41, to develop the electrostatic latent image into an image formed with the developer. The developer is supplied from a developer supplying portion not shown, to the developing device 43.

Further, the transfer device 45 transfers the image formed with the developer on the surface of the photosensitive member 41, to the recording medium 9 being moved between the photosensitive member 41 and the transfer device 45. The cleaning device 47 removes the developer remaining on the surface of the photosensitive member 41.

The fixing portion 6 sends out the recording medium 9 on which the image has been formed, while nipping the recording medium 9 between a heating roller 61 having a heater therein and a pressure roller 62. By doing this, the fixing portion 6 heats the developer on the recording medium 9 to fix the image on the recording medium 9.

The operation display portion 80 is an operation input portion including a touch panel, operation buttons, and the like, for example, and also is a display portion including a liquid crystal display panel, a notification lamp, and the like.

The control portion 8 controls various electric devices included in the image forming apparatus 10, on the basis of input information inputted through the operation display portion 80 and detection results from various sensors. Further, the control portion 8 also executes image processing on image data outputted from each of the first image sensor 13a and the second image sensor 13b.

For example, as shown in FIG. 4, the control portion 8 includes an MPU (microprocessor unit) 81, a storage portion 82, a mechanism control portion 83, an image sensor control portion 84, an image processing portion 85, an AFE (analog front end) 87, and the like. Further, the control portion 8 also includes a laser control portion 86 which realizes control functions on the body portion 2 side.

The MPU 81 is a processor which executes various calculation processes. The storage portion 82 is a nonvolatile information storage medium in which programs that cause the MPU 81 to execute various processes and other information are stored in advance. The storage portion 82 is an information storage medium from which and into which various information can be read and written by the MPU 81.

The control portion 8 comprehensively controls the image forming apparatus 10, by the MPU 81 executing various programs stored in advance in the storage portion 82.

The mechanism control portion 83 controls the document sheet sending-out mechanism 122 and the document sheet conveying mechanism 123, and the scanning mechanism 110. For example, when a predetermined first start condition has been established, the mechanism control portion 83 causes the document sheet sending-out mechanism 122 and the document sheet conveying mechanism 123 to operate. Accordingly, the document sheet 90 is conveyed along the document sheet conveying path R0. When a predetermined second start condition has been established, the mechanism control portion 83 causes the scanning mechanism 110 to operate. Accordingly, the first image sensor 13a is moved along the sub scanning direction D2.

For example, the first start condition is that: a predetermined start operation has been performed on the operation display portion 80 in a state where a sensor not shown has detected that the document sheet table cover 12 had been closed, and that the document sheet 90 had been set on the document sheet supply tray 121.

The second start condition is that: the start operation has been performed on the operation display portion 80 in a state where a sensor not shown has detected that the document sheet table cover 12 had been closed, and that the document sheet 90 had not been set on the document sheet supply tray 121.

The image sensor control portion 84 controls the operation timing of the image sensor 13. The image sensor control portion 84 includes a light emission control portion 841 and a data output control portion 842.

The light emission control portion 841 outputs a light emission signal Es at a necessary timing, to each of the red light emitting portion 131R, the green light emitting portion 131G, and the blue light emitting portion 131B of the image sensor 13. The light emission control portion 841 individually outputs a red light emission signal Es-R which causes the red light emitting portion 131R to emit light at a desired brightness, a green light emission signal Es-G which causes the green light emitting portion 131G to emit light at a desired brightness, and a blue light emission signal Es-B which causes the blue light emitting portion 131B to emit light at a desired brightness.

The data output control portion 842 controls the timings of receiving of light and outputting of the primary image data Ia performed by the light amount sensor 133. The data output control portion 842 outputs a start pulse signal Sp to the light amount sensor 133 at a necessary timing.

The start pulse signal Sp is a control signal which causes the light amount sensor 133 to output primary image data Ia that corresponds to the amount of received light from the immediately preceding output time point of the start pulse signal Sp until the current output time point thereof. The start pulse signal Sp is also a control signal that initializes the light amount sensor 133 and that causes the light amount sensor 133 to newly start receiving light. The primary image data Ia is transferred to the AFE 87.

The AFE 87 is circuitry that performs predetermined data processing on the primary image data Ia outputted from the image sensor 13. The data processing performed by the AFE 87 includes a level shift process for adjusting the offset level of the primary image data Ia, an amplification process for amplifying the primary image data Ia, and an A/D conversion process for converting the analog primary image data Ia into digital secondary image data Id.

That is, the AFE 87 converts primary image partial data Ia1 into secondary image partial data Id1, converts primary image partial data Ia2 into secondary image partial data Id2, and converts primary image partial data Ia3 into secondary image partial data Id3.

In the example shown in FIG. 4, the AFE 87 includes a first AFE 87a and a second AFE 87b. The first AFE 87a converts primary image data Ia outputted from the first image sensor 13a into secondary image data Id. The second AFE 87b converts primary image data Ia outputted from the second image sensor 13b into secondary image data Id.

The image processing portion 85 executes various image processing using, as input data, the secondary image data Id obtained through the AFE 87. For example, the image processing portion 85 executes well-known image processing such as a shading correction process, a process of converting data that corresponds to light amount into data that corresponds to density, gamma correction, and the like.

The laser control portion 86 controls intensity of laser light to be emitted from the laser scanning portion 5, in accordance with density information of each pixel in tertiary image data Idy having been subjected to image processing performed by the image processing portion 85. Accordingly, an electrostatic latent image corresponding to the tertiary image data Idy is formed on the surface of the photosensitive member 41.

In the present embodiment, the primary image partial data Ia1, Ia2, and Ia3, and the secondary image partial data Id1, Id2, and Id3 are examples of detection data from the single-channel light amount sensors 1331, 1332, and 1333, respectively. The secondary image partial data Id1, Id2, and Id3 are detection data outputted through the AFE 87 from the single-channel light amount sensors 1331, 1332, and 1333, respectively.

Meanwhile, power consumption of the image sensor 13, which is a CIS module having a plurality of channels, abruptly and temporarily drops before each single-channel light amount sensor 1331, 1332, 1333 starts output of detection data. Thus, depending on the performance of the power source 15 which supplies power to the image sensor 13, the voltage Vi applied to the image sensor 13 temporarily increases before each single-channel light amount sensor 1331, 1332, 1333 starts output of primary image data Ia which is detection data. The magnitude of the increase in the applied voltage Vi is not constant.

Figure 5:
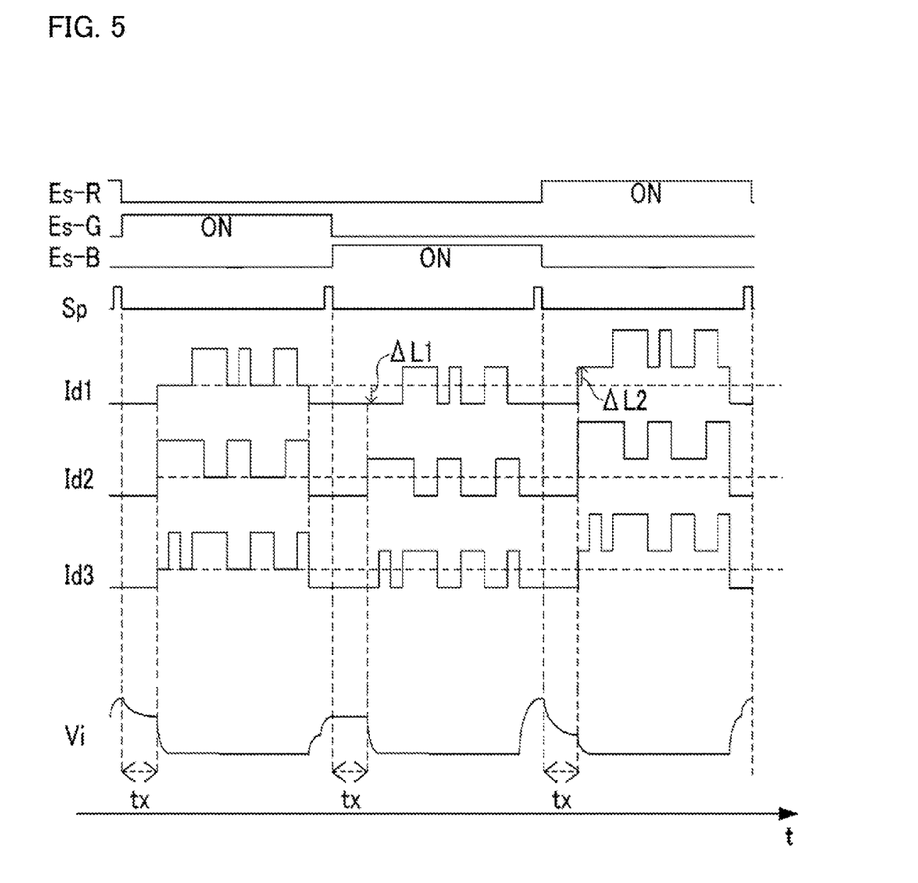
FIG. 5 is a time chart of data regarding the image sensor in the image reading device according to the embodiment of the present disclosure.

FIG. 5 is a time chart of data related to the image sensor 13. FIG. 5 shows a case where the image sensor 13 operates in a color mode in which the image of the document sheet 90 is read as a color image.

As shown in FIG. 5, in the case where the operation mode of the image sensor 13 is the color mode, a red light emission signal Es-R, a green light emission signal Es-G, and a blue light emission signal Es-B are outputted in order. Accordingly, the red light emitting portion 131R, the green light emitting portion 131G, and the blue light emitting portion 131B sequentially emit light.

Every time each of the red light emitting portion 131R, the green light emitting portion 131G, and the blue light emitting portion 131B emits light, a start pulse signal Sp is outputted. A certain period from the output of the start pulse signal Sp is a buffer transfer period tx in which the primary image partial data Ia1, Ia2 Ia3 is outputted from the single-channel light amount sensor 1331, 1332, 1333 to a buffer not shown. The buffer transfer period tx is a period before the single-channel light amount sensor 1331, 1332, 1333 starts externally outputting the primary image partial data Ia1, Ia2, Ia3. The buffer is present on the data transmission path from the light amount sensor 133 to the AFE 87.

As shown in FIG. 5, in the buffer transfer period tx before the single-channel light amount sensor 1331, 1332, 1333 starts externally outputting the primary image partial data Ia1, Ia2, Ia3, the applied voltage Vi from the power source 15 to the image sensor 13 temporarily increases. The magnitude of the increase of the applied voltage Vi is not constant. When the applied voltage Vi varies in this manner, the level of the primary image partial data Ia1, Ia2, Ia3 varies irrespective of the detected light amount. Thus, the level of the secondary image partial data Id1, Id2, Id3 also varies irrespective of the detected light amount.

In FIG. 5, ΔL1 and ΔL2 each show the magnitude of variation of the secondary image partial data Id1, Id2, Id3 caused by various magnitudes of the variation of the applied voltage Vi.

When the level of the secondary image partial data Id1, Id2, Id3 has varied irrespective of the detected light amount, a noise image such as a streak extending along the main scanning direction D1 appears in the output image, thus causing lowered image quality.

On the other hand, suppressing variation of the applied voltage Vi by employing a power source 15 that has a high performance of maintaining voltage leads to increased power source cost.

However, if the image reading device 1 is employed, it is possible to prevent lowering of the image quality of the output image caused by variation of the applied voltage Vi from the power source 15 to the image sensor 13, while suppressing cost of the power source 15 for the image sensor 13. The details will be described below.

[Details of Image Reading Device]

As shown in FIG. 3, the image reading device 1 includes a light-blocking portion 17. The light-blocking portion 17 is a member that blocks light advancing toward a reference portion 1331x of the single-channel light amount sensor 1331. The reference portion 1331x is an end portion, of the single-channel light amount sensor 1331, which corresponds to an end portion of the main scanning region A0. For example, the reference portion 1331x is the photoelectric conversion elements corresponding to a plurality of pixels counted from the extreme end of the single-channel light amount sensor 1331.

That is, the reference portion 1331x is an end portion of the light amount sensor 133, and, at the same time, an end portion of the single-channel light amount sensor 1331 which is located at the extreme end among the plurality of single-channel light amount sensors 1331, 1332, and 1333. In the example shown in FIG. 3, the reference portion 1331x is one of the end portions of the light amount sensor 133.

As shown in FIG. 3, the main scanning region A0 includes a valid main scanning region A1 corresponding to the maximum width of the document sheet 90 readable by the image reading device 1, and an invalid main scanning region A2 which is present outside the valid main scanning region A1. The reference portion 1331x is the portion corresponding to the invalid main scanning region A2.

The light-blocking portion 17 maintains the light receiving environment for the reference portion 1331x at a constant dark state. In this case, data regarding the reference portion 1331x in the primary image data Ia indicates the minimum level of the amount of light detected by the single-channel light amount sensor 1331. The light-blocking portion 17 is one example of an environment maintaining portion which maintains the light receiving environment for the reference portion 1331x at a constant state.

Figure 6:
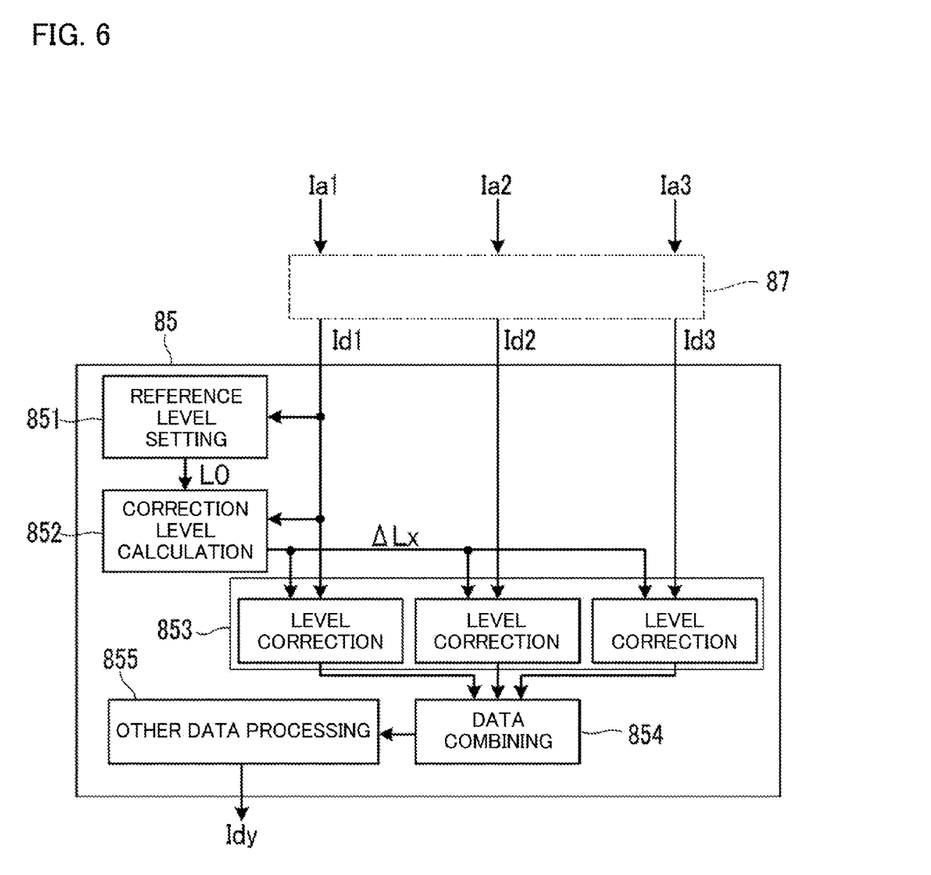
FIG. 6 is a block diagram of an image processing portion in the image reading device according to the embodiment of the present disclosure.

As shown in FIG. 6, the image processing portion 85 includes a reference level setting portion 851, a correction level calculation portion 852, a level correction portion 853, a data combining portion 854, and an other data processing portion 855. In FIG. 6, the AFE 87 is indicated by virtual lines (alternate long and two short dashes lines).

The reference level setting portion 851 automatically sets a reference level L0 to be used by the correction level calculation portion 852. The reference level setting portion 851 sets, as the reference level L0, the level of detection data regarding the reference portion 1331x obtained while the light emitting portion 131 is off. The level of the detection data is the detection data itself, a representative value of the detection data, or the like.

For example, the reference level setting portion 851 sets, as the reference level L0, a representative value for data of pixels in the reference portion 1331x. The representative value is an average value, a minimum value, or the like.

The reference level setting portion 851 executes the process of setting the reference level L0, when the process of reading the image of the document sheet 90 is not performed. For example, when a sensor not shown has detected that the document sheet table cover 12 had been closed, or that the document sheet 90 had been placed on the document sheet supply tray 121, the reference level setting portion 851 executes the process of setting the reference level L0. It is also conceivable that the reference level setting portion 851 executes the process of setting the reference level L0 immediately before the start of the process of reading the image of the document sheet 90.

The correction level calculation portion 852 calculates a deviation ΔLx between the reference level L0 set in advance and the level of detection data regarding the reference portion 1331x obtained when the process of reading the image of the document sheet 90 is performed. The correction level calculation portion 852 calculates the deviation ΔLx, each time the light amount sensor 133 outputs primary image data Ia that corresponds to the main scanning region A0.

The level correction portion 853 corrects the level of each of the secondary image partial data Id1, Id2, and Id3 from all the respective single-channel light amount sensors 1331, 1332, and 1333, in accordance with the deviation ΔLx. At that time, the level correction portion 853 performs the correction by shifting the level of each of the secondary image partial data Id1, Id2, and Id3 such that the deviation ΔLx becomes 0.

Each time the light amount sensor 133 outputs primary image data Ia that corresponds to the main scanning region A0, the level correction portion 853 corrects the level of each of the secondary image partial data Id1, Id2, and Id3 from all the respective single-channel light amount sensors 1331, 1332, and 1333, in accordance with the latest deviation ΔLx.

Therefore, in the case where the image sensor 13 operates in the color mode, the level correction portion 853 corrects, for each color of light emitted from the light emitting portion 131, the level of each of the secondary image partial data Id1, Id2, and Id3 from all the respective single-channel light amount sensors 1331, 1332, and 1333, in accordance with the deviation ΔLx.

As described above, in the color mode, the red light emitting portion 131R, the green light emitting portion 131G, and the blue light emitting portion 131B sequentially emit light, and the single-channel light amount sensors 1331, 1332, and 1333 respectively output primary image partial data Ia1, Ia2, and Ia3 for each emitted light color.

Meanwhile, in the monochrome mode in which the image of the document sheet 90 is read as a monochrome image, the entirety of the light emitting portion 131 emits light. Further, the single-channel light amount sensors 1331, 1332, and 1333 sequentially output primary image partial data Ia1, Ia2, and Ia3, respectively, in a cycle set in advance.

Therefore, in the monochrome mode, every time each single-channel light amount sensor 1331, 1332, 1333 outputs primary image partial data Ia1, Ia2, Ia3 cyclically while the light emitting portion 131 is emitting light, the level correction portion 853 corrects the level of secondary image partial data Id1, Id2, Id3.

The magnitudes of the variations of the primary image partial data Ia1, Ia2, and Ia3 caused by various magnitudes of the variation of the applied voltage Vi are substantially the same among the primary image partial data Ia1, Ia2, and Ia3 which are outputted at the same time, respectively. In other words, the magnitudes of the variations of the secondary image partial data Id1, Id2, and Id3 are substantially the same among the secondary image partial data Id1, Id2, and Id3 which are outputted at the same time.

Therefore, if the level of each of the secondary image partial data Id1, Id2, and Id3 from all the respective single-channel light amount sensors 1331, 1332, and 1333 is corrected by using the deviation ΔLx obtained from detection data from one single-channel light amount sensor 1331, errors caused by variation of the applied voltage Vi are removed from all the secondary image partial data Id1, Id2, and Id3.

The data combining portion 854 generates image data of the entirety of the valid main scanning region A1 by combining the corrected secondary image partial data Id1, Id2, and Id3. At that time, the data combining portion 854 generates image data of the entirety of the valid main scanning region A1 by removing data of the invalid main scanning region A2.

The other data processing portion 855 executes image processing such as a well-known shading correction process, a process of converting data that corresponds to light amount into data that corresponds to density, and the like, and outputs tertiary image data Idy having been processed. Then, the image forming portion 4 forms on the recording medium 9 an image that corresponds to the tertiary image data Idy obtained by the image reading device 1. The tertiary image data Idy is the detection data from the light amount sensor 133 having been corrected by the correction level calculation portion 852 and the level correction portion 853.

As described above, if the image reading device 1 is employed, even when the voltage maintaining performance of the power source 15 is not so high, it is possible to prevent lowering of the image quality of the output image caused by variation of the applied voltage Vi from the power source 15 to the image sensor 13. Therefore, cost of the power source 15 can be suppressed.

In addition, since the light-blocking portion 17 is employed as a member that maintains the light receiving environment for the reference portion 1331x at a dark state, the level of the detection data regarding the reference portion 1331x obtained while the light emitting portion 131 is off can be used as the reference level L0. This facilitates setting of the reference level L0.

In the color mode, the magnitude of variation of the applied voltage Vi differs for each color of light emitted from the light emitting portion 131. Thus, it is effective that data corrections by the correction level calculation portion 852 and by the level correction portion 853 are performed each time the color of light emitted from the light emitting portion 131 is switched.

Application Example

In the image reading device 1, it is also conceivable that a reference color member having a surface of black or another color formed thereon is used instead of the light-blocking portion 17. In this case, the reference color member is disposed at a position opposed to the reference portion 1331x of the single-channel light amount sensor 1331. The reference color member is one example of the environment maintaining portion.

It is also conceivable that, in the image reading device 1, the AFE 87 executes, instead of the image processing portion 85, the processes performed by the correction level calculation portion 852 and by the level correction portion 853. In this case, the AFE 87 performs the same processes as the processes performed by the correction level calculation portion 852 and the level correction portion 853, on the primary image partial data Ia1, Ia2, and Ia3.

It is also conceivable that, in the image processing portion 85, the correction level calculation portion 852 and the level correction portion 853 execute a correction process on the image data obtained through the combining performed by the data combining portion 854.

The image reading device and the image forming apparatus according to the present disclosure can be configured by freely combining the embodiment and the application example described above, or modifying or partially omitting the embodiment and the application example as appropriate, within the scope of the disclosure recited in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   an image sensor module including: a light emitting portion configured to emit light to a main scanning region extending along one straight line; and a plurality of single-channel light amount sensors configured to perform in parallel receiving light from corresponding partial scanning regions which are each a part of the main scanning region, and outputting detection data of an amount of the received light;
   an environment maintaining portion configured to maintain, at a constant state, a light receiving environment for a reference portion forming an end portion of a single-channel light amount sensor which corresponds to an end portion of the main scanning region; and
   a level correction portion configured to correct, each time the image sensor module outputs the detection data that corresponds to the main scanning region, a level of detection data newly obtained from each of all the single-channel light amount sensors in accordance with a deviation between a level of newly obtained detection data regarding the reference portion and a reference level set in advance, wherein
   the environment maintaining portion is a light-blocking portion configured to block light advancing toward the reference portion; and
   the plurality of single-channel light amount sensors are disposed in series along the one straight line without overlapping each other.

2. The image reading device according to claim 1, further comprising
   a reference level setting portion configured to set, as the reference level, the level of the detection data regarding the reference portion obtained while the light emitting portion is off.

3. The image reading device according to claim 1, wherein
   the image sensor module includes a plurality of the light emitting portions respectively having different emitted light colors and respectively being capable of emit light individually, and
   when the light emitting portions sequentially emit light and each of the single-channel light amount sensors outputs the detection data for each emitted light color, the level correction portion corrects the level of the detection data from each of all the single-channel light amount sensors in accordance with the deviation between the level of the detection data regarding the reference portion and the reference level, for each emitted light color.

4. An image forming apparatus comprising:
   the image reading device according to claim 1; and
   an image forming portion configured to form, on a recording medium, an image that corresponds to the detection data having been corrected, the detection data being obtained by the image reading device.

* * * * *